United States Patent Office 3,660,434
Patented May 2, 1972

3,660,434
SILOXANE-CONTAINING EPOXIDE COMPOUNDS
William J. Patterson, Madison, Ala., assignor to the United States of America as represented by the Administrator of the National Aeronautics and Space Administration
No Drawing. Original application Mar. 26, 1968, Ser. No. 715,975, now Patent No. 3,516,964, dated June 23, 1970. Divided and this application Jan. 27, 1970, Ser. No. 870,689
Int. Cl. C07f 7/08
U.S. Cl. 260—348 SC    12 Claims

ABSTRACT OF THE DISCLOSURE

Siloxane-containing epoxy polymers are prepared by reacting siloxane-containing epoxides with siloxane-containing diamines. Both the epoxide, exemplified by the formula

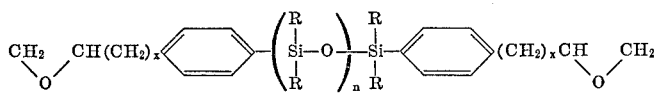

and the diamine reactant

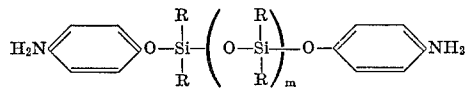

are characterized by their capability for inclusion of a controllable number of siloxane groups. The product polymers exhibit a low dielectric constant and other properties favorable to their use for electronic packaging applications. Methods for preparation of the reactant monomers are also disclosed.

---

The invention described herein was made by an employee of the United States Government and may be manufactured and used by or for the Government for governmental purposes without the payment of any royalties thereon or therefor.

This application is a divisional application of application Ser. No. 715,975, filed Mar. 26, 1968, now U.S. Pat. 3,516,964.

BACKGROUND OF THE INVENTION

This invention relates to siloxane-containing epoxy polymers and more particularly to the synthesis of such polymers and the siloxane-containing diepoxides and amines from which the polymers are prepared.

In the field of polymeric packaging materials for electronic assemblies a continuing need has existed for improved embedment materials which will meet stringent dielectric requirements and exhibit the required physical and thermal properties. Such materials should exhibit a low dielectric loss, along with mechanical toughness, ease of application, and good thermal stability. No one polymer system has shown all of the properties necessary to meet these requirements, although siloxane and epoxy polymers each are favorable in some respects. Siloxane polymers in general exhibit the desired electrical and thermal properties, and epoxy polymers possess other key attributes including mechanical toughness and ease of application.

Siloxane-containing epoxy polymers combining to some extent the properties of the two systems have been prepared previously by incorporating siloxane linkages in the diepoxide component, but the dielectric loss for the combined polymer has been too high for electronic packaging applications, a dielectric constant of 4 to 6, measured at one kilocycle frequency, normally being obtained. The high dielectric constant results from the presence of a high proportion of polar groups per given length of polymer chain, the polar groups being supplied by the aromatic or aliphatic diamines used as curing agents. A further disadvantage for polymers prepared by curing siloxane-containing epoxides with highly polar amines is the mutual insolubility and incompatibility of the two reagents, which results in incomplete mixing and non-homogeneity in the product resin.

One approach to the solution of these problems is the use of amine curing agents which contribute to a lower proportion of polar groups in the polymer, with non-polar groups such as siloxane linkages being incorporated in the amine molecule. Suitable siloxane-containing amines have not been available, however, so that the synthesis of novel amines of this type is required. In addition, novel siloxane-containing diepoxide reactants having a siloxane linkage of controllable length are desired to enable further control over polymer properties.

SUMMARY OF THE INVENTION

In the present invention novel siloxane-containing epoxy polymers are prepared by reacting siloxane-containing diepoxides with aromatic diamines having siloxane groups incorporated therein. Novel siloxane-containing diepoxide and amine reactants characterized by their controllable amount of siloxane groups are provided, along with processes for synthesizing the same. By varying the amount of siloxane groups in these reactants the mechanical and electrical properties of the cross-linked polymer can be controlled. Polymers having a low dielectric constant, consistent with favorable mechanical and thermal properties are obtained by this means. The use of siloxane-containing amines as curing agents also eliminates the incompatibility problem encountered with the amines used previously.

It is therefore an object of this invention to provide siloxane-containing epoxy polymers having a low dielectric constant and mechanical and thermal properties favorable to their use as encapsulating or packaging materials for electronic assemblies.

Another object is to provide a process for preparation of said polymers.

Another object is to provide siloxane-containing aromatic diamines which are compatible and mutually soluble with siloxane-containing diepoxides.

Yet another object is to provide a process for preparing siloxane-containing aromatic diamines.

Still another object is to provide liquid diepoxide polymer precursors containing a predetermined proportion of siloxane moieties.

Another object is to provide a method of preparing siloxane-containing diepoxides wherein a controlled number of siloxane groups is incorporated in the molecule.

Other objects and advantages of the invention will be apparent from the following detailed description and appended claims.

DESCRIPTION OF THE PREFERRED EMBODIMENT

The epoxide reactant

The epoxide reactant for polymer preparation in this invention is characterized by the presence of at least two epoxide

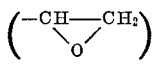

groups at terminal positions in the molecule and a controlled number of siloxane

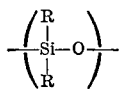

groups at intermediate positions. One type of suitable epoxide reactant is represented by the formula

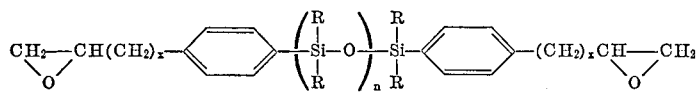

where R is a monovalent hydrocarbon radical, including alkyl radicals such as methyl, ethyl, propyl and the like; aryl radicals such as phenyl, naphthyl, xylyl and the like and aralkyl radicals such as benzyl and phenyl-ethyl, $n$ is a whole number from 2 to 4, and $x$ is a whole number from 0 to 4. Compounds wherein R is methyl are preferred owing to their ease of preparation and handling. Examples of specific diepoxides falling within this formula include 1,5-bis(p-(2,3-epoxypropyl)phenyl)hexamethyltrisiloxane, 1,7 - bis(p-(2,3-epoxypropyl)phenyl)octamethyltetrasiloxane and 1,9-bis(p-(2,3-epoxypropyl)phenyl)decamethylpentasiloxane. Compounds of this type can be prepared by epoxidation of silane compounds having terminal double bonds, which compounds in turn are prepared by reaction of aminosilanes with silanols.

In the aminosilane-silanol reaction two moles of a silanol having the formula

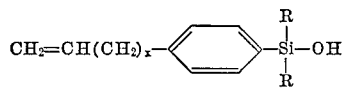

where R is a monovalent hydrocarbon radical and preferably an alkyl radical such as methyl and $x$ is a whole number from 0 to 4 are condensed with one mole of a difunctional aminosilane having the formula

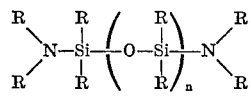

where R is a monovalent hydrocarbon radical as defined above and $n$ is from 0 to 2. Both of these reactants can be prepared by previously known methods. The amount of siloxane groups in the product polymer is controlled by selecting an aminosilane having the desired siloxane chain length. The condensation reaction is preferably carried out by addition of the silanol to the aminosilane. Although not critical, a solvent such as benzene or toluene can be used. A temperature of 50 to 100° C. is preferred for the reaction. Under these conditions the reaction is normally completed in a period of 1 to 2 hours. The extent of reaction can be monitored by titration of the dialkylamine evolved during the reaction with hydrochloric acid. The product is a diolefin having the formula

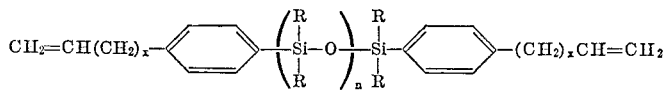

where R and $n$ and $x$ are as defined above. The product, in the form of an oily liquid, can be converted to a diepoxide by previously known epoxidation procedures wherein the terminal double bonds are reacted with a peracid such as trifluoroperacetic acid. The epoxidation reaction with this reagent proceeds rapidly at room temperature, although a higher temperature such as 30 to 40° C. may be necessary in some cases to minimize a contaminating esterification reaction. A basic additive such as sodium or potassium carbonate can be used as scavenger for the liberated trifluoroacetic acid.

Another type of epoxide reactant is represented by the formula

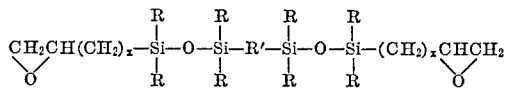

where R and $x$ are as defined above and R' is a divalent aromatic radical such as p-phenylene, m-phenylene, diphenylene, diphenylene ether and the like. This type of epoxide can be prepared by epoxidation of the corresponding silane compound having terminal double bonds, the silane compound in turn being prepared by reaction of a difunctional silanol with a monofunctional aminosilane. The difunctional silanol is represented by the formula

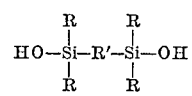

where R is a monovalent hydrocarbon radical and R' is a divalent aromatic radical as described above. One mole of this compound is reacted with two moles of an aminosilane having the formula

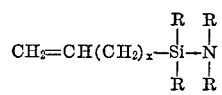

where R and $x$ are as described above. The reaction proceeds in a manner similar to the condensation reaction described above, and it can be carried out under the same conditions. The product of this reaction can be converted to the corresponding epoxide by the procedure given above. Examples of specific epoxides prepared by this procedure include 1,4 - bis((p-2,3-epoxypropyl)(phenyldimethylsiloxy)dimethylsilyl)benzene and 1,4-bis-((epoxyethyldimethylsiloxy)dimethylsilyl)benzene. Epoxides of this type can also be prepared by the addition reaction of a silicon hydride with a compound containing a terminal epoxy group and a terminal double bond. For example 1,4-bis((3,4 - epoxybutyl - dimethylsiloxy)dimethylsilyl) benzene is prepared by reaction of 1,4-bis((dimethylsiloxy)dimethylsilyl)benzene with 3,4-epoxy-1-butene, This reaction proceeds smoothly and exothermically at 70 to 75° C. in the presence of a chloroplatinic acid catalyst.

Trifunctional epoxides for use in the polymerization reaction can be prepared by epoxidation of the corresponding trifunctional silanes which in turn are prepared by reaction of trifunctional aminosilane with a monofunctional silanol. Epoxides of this type are represented by the formula

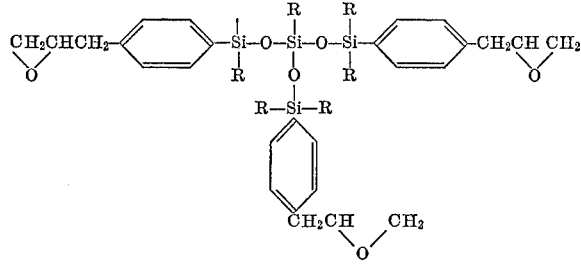

where R is a monovalent hydrocarbon radical as described above. Compounds of this type are exemplified by methyl-tris(p-(2,3-epoxypropyl)phenylimethylsiloxy)silane, prepared by epoxidatioin of tris(p-allylphenylimethylsiloxy)methyl silane, which in turn is prepared by reaction of one mole of methyl-tris(dimethylamino)silane with three moles of p-allylphenyldimethylsilanol.

The diamine reactant

The diamine reactant for the polymerization reaction in the present invention is represented by the formula

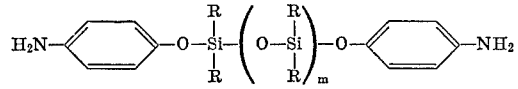

where $m$ is a whole number from 0 to 2 and R is a monovalent hydrocarbon radical, and in particular an alkyl radical such as methyl. Compounds of this type can be prepared by reaction of two moles of p-aminophenol with one mole of an amino silane having the formula

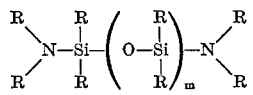

where $m$ and R are defined above for the diamine. The methyl substituted form of this compound is preferred over the higher alkyl-substituted aminosilane since the reaction with p-aminophenol proceeds more efficiently, presumably due to the lack of steric hindrance which is encountered in the higher alkyl forms. Examples of specific amines prepared by this reaction include bis(p-aminophenoxy)dimethylsilane, 1,3,-bis(p-aminophenoxy)tetramethyldisiloxane and 1,5-bis(dimethylamino)hexamethyltrisiloxane. The phenol-aminosilane reaction to produce these compounds can be carried out readily by heating the mixture to 50 to 100° C. The amine product is an oily liquid or low-melting solid which reacts readily with epoxides in the polymerization reaction. The liquid compounds are preferred since the liquid state of these compounds and their mutual solubility with siloxane-containing epoxides provide significant advantages over previously used amine curing agents in the polymerization reaction.

Epoxy-siloxane polymer preparation

Siloxane-containing epoxy polymers can be obtained by reacting the diamines described above with any epoxide having a functionality of two or more. In addition to the siloxane-containing diepoxides and triepoxides described above, the diamine can be reacted with other epoxides of the required functionality, for example, epoxides having terminal allylglycidyl ether groups,

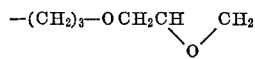

Polymerization is carried out by heating a mixture of the diamine and epoxide compound, preferably at a slight stoichiometric excess of epoxy, that is an epoxy group to amine hydrogen molar ratio of 1:0.95. A temperature of 80° C. to 120° C. can be used, and about 100° C. is preferred. Polymerization to a tough, solid thermoset material is usually completed in 24 hours, although longer times can be used if required.

In some cases the reactivity of the siloxane-containing epoxides toward the siloxane-containing diamine reactant described above is low, for example, for epoxides containing epoxyethyldimethylsilyl groups,

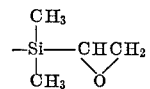

and the more basic aliphatic amines such as ethylene diamine, diethylenetriamine or triethylenetetramine can be used to produce a thermoset material, at some sacrifice in dielectric properties. It is to be understood that, although the combination of a siloxane-containing amine reactant and a siloxane-containing epoxide reactant is preferred for best electrical properties, the invention includes the polymers obtained by reacting the novel siloxane-containing epoxides described above with previously known amine reactants or other epoxy curing agents and the polymers obtained by reacting the novel siloxane-containing amines with previously known epoxides. In addition, combinations of two or more epoxide or amine reactants can be used.

Polymer properties can be controlled by selection of reactants having the desired number of siloxane groups. Higher flexibility of the product and properties more nearly characteristic of silicone polymers are obtained with increasing numbers of siloxane groups, and the dielectric constant is decreased.

The invention is further illustrated by the following examples. Examples 1 through 6 show preparation of silane compounds having double bonds at terminal positions, Example 7 shows preparation of a silicon hydride, Examples 8 through 13 show epoxidation of the products of Examples 1 through 6, Example 14 shows preparation of an epoxide from a silicon hydride, Examples 15 through 17 show preparation of siloxane containing diamines and Example 18 shows polymerization of various combinations of amines and epoxides.

EXAMPLE I 1,5-bis(p-allylphenyl)hexamethyltrisiloxane was prepared by reacting 5.07 g., 0.0347 mole of bis(dimethylamino)dimethylsilane with 20 g., 0.104 mole p-allylphenyldimethylsilanol. The silane was added dropwise to the silanol and the mixture was stirred under a stream of nitrogen at room temperature. The nitrogen purge stream was bubbled into a known volume and molarity of hydrochloric acid. The temperature was increased to 50° C., and dimethylamine began to evolve. The temperature was then held for one hour each at 50° C., 75° C. and 100° C., with the pressure being reduced to 30 to 35 torr. during the last hour. Calculation of the amine evolved indicated that the condensation reaction was 95.5 percent completed. The crude product was neutral to wet pH paper and had a light straw color. Distillation in a molecular still produced a pale yellow oil at a yield of 85 percent, boiling point 146–151° C. at $10^{-3}$ torr.

*Analysis.*—Calculated for $C_{24}H_{36}O_2Si_3$ (percent): C, 65.45; H, 8.18; Si, 19.09. Found (percent): C, 66.79; H, 8.70; Si, 19.25. Calculated molecular weight: 440. Found: 429.

EXAMPLE II 1,7-bis(p-allylphenyl)octamethyltetrasiloxane was prepared by reacting 5 g., 0.023 mole, 1,3-bis(dimethylamino)tetramethyldisiloxane with p-allylphenyldimethylsilanol by the procedure of Example I. The crude yield was 94 percent, determined by amine titration. The product was recovered at a yield of 84 percent by molecular distillation, boiling point 163–168° C.

*Analysis.*—Calculated for $C_{26}H_{42}O_3Si_4$ (percent): C, 60.70; H, 8.17; Si, 21.79. Found (percent): C, 61.35; H, 8.50; Si, 21.43. Calculated molecular weight: 516. Found: 524.

EXAMPLE III 1,9 - bis(p-allylphenyl)hexamethyltrisiloxane was prepared by reacting 5 g., 0.017 mole, 1,5-bis(dimethylamino) hexamethyltrisiloxane with 6.53 g., 0.104 mole, p-allylphenyldimethylsilanol by the procedure of Example I. The crude yield was 95 percent, determined by amine titration. The product was recovered at a yield of 82 percent by molecular distillation, boiling point 174–179° C.

*Analysis.*—Calculated for $C_{26}H_{48}O_4Si_5$ (percent): C, 57.14; H, 8.16; Si, 23.81. Found (percent): C, 56.82; H, 8.05; Si, 23.65. Calculated molecular weight 590. Found: 599.

EXAMPLE IV

Tris(p-allylphenyldimethylsiloxy)methylsilane was prepared by reacting 6.05 g., 0.0346 mole, methyltris(dimethylamino)silane with 20 g., 0.104 mole p-allylphenyldimethylsilanol by the procedure of Example I. A crude yield of 93 percent was obtained, as determined by amine titration. The product was recovered at a yield of 80 percent by molecular distillation, boiling point 165–170° C. at $10^{-4}$ torr.

*Analysis.*—Calculated for $C_{34}H_{48}O_3Si_4$ (percent): C, 66.23; H, 7.79; Si, 18.18. Found (percent): C, 65.82; H, 60; Si, 18.35. Calculated molecular weight: 616. Found: 602.

EXAMPLE V 1,4 - bis((p - allylphenyldimethylsiloxy)dimethylsilyl) benzene was prepared by reacting 10.3 g., 0.045 mole bis-(hydroxydimethylsilyl)benzene with 20 g., 0.0913 mole p - allylphenyldimethylaminodimethylsilane. The silanol was recrystallized to a constant melting point from toluene/petroleum ether and added as a nether solution to the silane at 25° C. A continuous evaluation of amine was observed. The mixture was heated to 50° C. for ½ hour to remove ether and at 75° C. for ½ hour under vacuum. The crude yield was 96 percent as indicated by amine titration. The product was recovered at a yield of 83 percent by molecular distillation, boiling point 154–159° C. at $5 \times 10^{-4}$ torr.

*Analysis.*—Calculated for $C_{32}H_{46}O_2Si_4$ (percent): C, 66.90; H, 8.01; Si, 19.51. Found (percent): C, 65.95; H, 7.85; Si, 19.62. Calculated molecular weight: 574. Found: 565.

EXAMPLE VI 1,4 - bis((vinyldimethylsiloxy)dimethylsilyl)benzene was prepared by reacting 17.5 g., 0.0775 mole 1,4-bis (hydroxydimethylsilyl)benzene with 20 g., 0.155 mole vinyldimethylaminodimethylsilane by the procedure of Example V. The product was recovered at a yield of 81 percent by molecular distillation, boiling point 110–113° C. at 0.1 torr.

*Analysis.*—Calculated for $C_{18}H_{34}O_2Si_4$ (percent): C, 54.82; H, 8.63; Si, 28.42. Found (percent): C, 54.21; H, 9.40; Si, 28.88. Calculated molecular weight: 394. Found: 388.

EXAMPLE VII 1,4-bis((dimethylsiloxy)dimethylsilyl)benzene was prepared by reacting 10 g., 0.044 mole 1,4-bis(hydroxydimethylsilyl(benzene with 8.9 g., 0.089 mole dimethylaminodimethylsilane by the procedure of Example V. The product was recovered at a yield of 81 percent by fractional distillation, boiling point 95–96° C. at 5 torr.

*Analysis.*—Calculated for $C_{14}H_{30}O_2Si_4$ (percent): C, 49.12; H, 8.77; Si, 32.75. Found (percent): C, 48.50; H, 8.95; Si, 31.9. Calculated molecular weight: 342. Found: 350.

EXAMPLE VIII 1,5 - bis(p - (2,3 - epoxypropyl)phenyl)hexamethyltrisiloxane was prepared by epoxidation of the product of Example I by the following procedure. A mixture of 89.5 percent hydrogen peroxide, 1.74 g., 0.0456 mole, and 25 ml. of methylene chloride was cooled to 0–5° C. To this was added trifluoroacetic anhydride, 11.8 g., 0.0562 mole, dropwise, while the temperature was maintained at 0–5° C. The mixture was stirred for an additional 15 minutes after the addition. The resulting cold trifluoroperacetic acid was added dropwise to a stirred mixture of the product of Example I, 5.0 g., 0.0114 mole, finely divided anhydrous sodium carbonate, 9.5 g., 0.089 mole, and 100 ml. of methylene chloride. The reaction mixture was allowed to reflux due to exotherm while the addition was carried over a period of one hour. The carbonate was removed by filtration, and the filtrate was treated with an additional 9.5 g. of sodium carbonate at 25° C. for 15 minutes. The resulting crude epoxide was recovered, and subjected to molecular distillation to produce a pale yellow oil at a yield of 70 percent, boiling point 163–168° C. at $10^{-3}$ torr.

*Analysis.*—Calculated for $C_{24}H_{36}O_4Si_3$ (percent): C, 61.02; H, 7.63; Si, 17.80. Found (percent): C, 60.1; H. 7.40; Si, 17.90. Calculated equivalent weight; 236. Found: 245.

1,7 - bis(p - (2,3 - epoxypropyl)phenyl)octamethyltetrasiloxane was prepared by epoxidation of the product of Example II by the procedure of Example VIII. Reactant proportions were as follows: product of Example II, 5 g., 0.0097 mole; hydrogen peroxide, 1.48 g., 0.0389 mole; trifluoroacetic anhydride, 10.06 g., 0.0479 mole; sodium carbonate, 7.62 g., 0.0719 mole. Purification by molecular distillation produced 3.9 g. (78 percent yield) of pale yellow oil, boiling point 182–187° C. at $10^{-3}$ torr.

*Analysis.*—Calculated for $C_{26}H_{42}O_5Si_4$ (percent): C, 57.14; H, 7.69; Si, 20.51. Found (percent): C, 56.80; H, 7.51; Si, 20.94. Calculated equivalent weight: 273. Found: 281.

EXAMPLE X 1,9 - bis(p - (2,3 - epoxypropyl)phenyl)decamethylpentasiloxane was prepared by epoxidation of the product of Example III by the procedure of Example VIII. Reactant proportions were as follows: product of Example III, 5 g., 0.0085 mole; hydrogen peroxide, 1.29 g., 0.0340 mole; trifluoroacetic anhydride, 8.80 g., 0.0419 mole; sodium carbonate, 6.65 g., 0.0628 mole. Purification by molecular distillation yielded 4.1 g. (82 percent) of a pale yellow oil, boiling point 191–196° C. at $10^{-3}$ torr.

*Analysis.*—Calculated for $C_{28}H_{48}O_6Si_5$ (percent): C, 54.19; H, 7.74; Si, 22.58. Found (percent): C, 53.50; H, 7.05; Si, 23.20. Calculated equivalent weight: 310. Found: 319.

EXAMPLE XI

Tris((p - 2,3 - epoxypropyl)phenyldimethylsiloxy) methylsilane was prepared by epoxidation of the product of Example IV by the procedure of Example VIII. Reactant proportions were as follows: product of Example IV, 5 g., 0.0075 mole; hydrogen peroxide, 1.53 g., 0.045 mole; trifluoroacetic anhydride, 11.22 g., 0.055 mole; sodium carbonate, 9.21 g., 0.087 mole. The crude epoxide was purified by molecular distillation to yield 3.4 g. (68 percent) of pale yellow oil, boiling point 201–206° C. at $10^{-4}$ torr.

*Analysis.*—Calculated for $C_{34}H_{48}O_6Si_4$ (percent): C, 61.44; H, 7.23; Si, 16.87. Found (percent): C, 60.80; H, 7.59; Si, 17.10. Calculated equivalent weight: 332. Found: 339.

EXAMPLE XII 1,4 - bis((p - (2,3 - epoxypropyl)phenyldimethylsiloxy) dimethylsilyl)benzene was prepared by epoxidation of the product of Example V by the procedure of Example VIII. Reactant proportions were as follows: product of Example V, 5 g., 0.00825 mole; hydrogen peroxide, 1.12 g., 0.033 mole; trifluoroacetic anhydride, 8.21 g., 0.041 mole; sodium carbonate, 6.89 g., 0.065 mole. The crude epoxide was purified by molecular distillation to yield 3.7 g. (74 percent) of pale yellow oil, boiling point 187–192° C. at $10^{-4}$ torr.

*Analysis.*—Calculated for $C_{32}H_{46}O_4Si_4$ (percent): C, 63.37; H, 7.59; Si, 18.48. Found (percent): C, 64.10; H, 7.40; Si, 18.96. Calculated equivalent weight: 303. Found: 308.

EXAMPLE XIII 1,4 - bis((epoxyethyldimethylsiloxy)dimethylsilyl)benzene was prepared by epoxidation of the product of Example VI by the following procedure. Hydrogen peroxide, 89.5 percent, 1.76 g., 0.0519 mole, was treated with trifluoroacetic anhydride, 10.83 g., 0.0516 mole, at 0–5° C. The cold peracid was added dropwise to a stirred mixture of the product of Example VI, 5 g., 0.0117 mole, anhydrous potassium carbonate, 8.1 g., 0.0585 mole; and 100 ml. of methylene chloride, which was maintained at 5° C. The peracid addition was carried out over a period of ½ hour, after which the mixture was quickly filtered and the filtrate treated with an additional 8.1 g. of potassium carbonate. The mixture was allowed to warm to 25° C., and the carbonate treatment was discontinued when the supernatant liquid gave a neutral reaction with hydrion paper. The residue was fractionally distilled to produce 4.3 g. (86 percent) of colorless oil, boiling point 125–127° C. at $5 \times 10^{-2}$ torr.

*Analysis.*—Calculated for $C_{18}H_{34}O_4Si_4$ (percent): C, 50.70; H, 7.98; Si, 26.29. Found (percent): C, 52.00; H, 7.90; Si, 26.60. Calculated equivalent weight: 213. Found: 218.

EXAMPLE XIV 1,4 - bis((3,4 - epoxybutyldimethylsiloxy)dimethylsilyl)benzene was prepared by the following procedure. 13.8 g., 0.0403 mole, of 1,4-bis((dimethylsiloxy)dimethylsilyl)benzene was added dropwise to a two-mole excess of freshly distilled 3,4-epoxy-1-butene and one ml. of chloroplatinic acid in acetone. The reaction mixture was stirred at 70–75° C. under nitrogen throughout the addition period of 1 and ½ hours. The mixture was then treated with 0.5 ml. of catalyst solution and stirred for an additional ½ hour at 70–75° C. and overnight at room temperature. The mixture was dissolved in 50 ml. of methylene chloride, treated with 0.1 g. of sodium carbonate and filtered through basic alumina. The product was recovered by fractional distillation at 70 percent yield as a colorless oil, boiling point 137–140° C. at $5 \times 10^{-3}$ torr.

*Analysis.*—Calculated for $C_{22}H_{42}O_4Si_4$ (percent): C, 54.77; H, 8.71; Si, 23.24. Found (percent): C, 53.80; H, 8.41; Si, 23.54. Calculated equivalent weight: 241. Found: 248.

EXAMPLE XV

Bis(p-aminophenoxy)dimethylsilane was prepared by adding bis(dimethylamino)dimethylsilane, 10 g., 0.685 mole, dropwise to a refluxing solution of p-aminophenol, 14.93 g., 0.137 mole, in benzene. The reaction mixture was heated at reflux for one hour after the addition. The crude product was recrystallized from benzene/petroleum ether in 60 percent yield as amber crystals, melting point 61–62° C.

*Analysis.*—Calculated for $C_{14}H_{18}N_2O_2Si$ (percent): C, 46.03; H, 6.57; N, 10.22; Si, 10.22. Found (percent): C, 45.22; H, 6.65; N, 10.05; Si, 10.95.

EXAMPLE XVI 1,3-bis(p-aminophenoxy)tetramethyldisiloxane was prepared by reacting 10 g., 0.045 mole 1,3-bis(dimethylamino)tetramethyldisiloxane with 9.9 g., 0.0908 mole p-aminophenol by the procedure of Example XV. The crude product distilled as an amber oil, boiling point 175–180° C. at 0.18 torr.

*Analysis.*—Calculated for $C_{16}H_{24}N_2O_3Si_2$ (percent): C, 55.17; H, 6.89; N, 8.04; Si, 16.09. Found (percent): C, 54.44; H, 6.21; N, 7.49; Si, 16.32.

EXAMPLE XVII 1,5 - bis(p - aminophenoxy)hexamethyltrisiloxane was prepared by reacting 10 g., 0.0226 mole 1,5-bis(dimethylamino)hexamethyltrisiloxane with 4.93 g., 0.0452 mole p-aminophenol by the procedure for Example XV. The crude product distilled as an amber oil, boiling point 215–220° C. at 0.2 torr.

*Analysis.*—Calculated for $C_{18}H_{30}N_2O_4Si_3$ (percent): C, 48.87; H, 6.79; Si, 19.00; N, 6.33. Found (percent): C, 47.90; H, 6.92; Si, 19.25; N, 6.21.

EXAMPLE XVIII

Siloxane-containing epoxy polymers were prepared by reacting the diepoxides with the diamines prepared as described in the above examples. In each case, except as otherwise indicated, one mole-equivalent of diepoxide was polymerized with 0.95 mole equivalent of diamine by heating a mixture thereof at 100° C. for 24 hours. The results obtained may be seen by reference to the following table.

TABLE ONE.—POLYMER PREPARATIONS

| Polymer designation | Epoxide from Ex. No. | Amine from Ex. No. | Polymer Appearance |
| --- | --- | --- | --- |
| A | VIII | XVI | Semi-flexible, tough amber solid. |
| B | IX | XVI | Flexible, tough amber solid. |
| C | X | XVI | Very flexible amber solid. |
| D [1] | XI | XVI | Glassy amber solid. |
| E | XII | XVI | Semi-flexible, very tough amber solid. |
| F | XIII | (EDA) [2] | Glassy, dark solid. |
| G | XIV | XVI | Glassy amber solid. |
| H | VIII and XI [3] | XVI | Semi-flexible, very tough solid. |
| I | VII | XV | Semi-flexible tough solid. |
| J | VIII | XVII | Flexible, tough solid. |
| K | ([4]) | XVI | Semi-flexible, tough solid. |

[1] Mole ratio of epoxide to diamine was 1:1.42, (this epoxide was tri functional).
[2] Ethylenediamine was used for polymer F; reactivity with the siloxane-containing amines was low.
[3] The molar ratios of the two epoxides and the amine, respectively, were 0.9:0.1:0.99.
[4] 1,3-bis(p-(2,3-epoxypropyl)phenyl)tetramethyldisiloxane.

Polymers A through K were polymerized in the form of castings from which two-inch diameter, 1/16 inch thick dielectric test specimens were fabricated. Dielectric measurements were performed at 25° C. and a frequency of one kilocycle. The results obtained are given in the following table.

TABLE TWO.—POLYMER DIELECTRIC PROPERTIES

| Polymer designation | Dielectric constant | Dissipation factor |
| --- | --- | --- |
| A | 3.2 | 0.03 |
| B | 3.2 | 0.025 |
| C | 3.1 | 0.010 |
| D | 3.4 | 0.025 |
| E | 3.2 | 0.02 |
| F | 4.5 | 0.05 |
| G | 3.8 | 0.03 |
| H | 3.4 | 0.025 |
| I | 3.5 | 0.02 |
| J | 3.2 | 0.04 |
| K | 3.3 | 0.01 |

It may be seen that all of the polymers, except F which was prepared from a highly polar amine curing agent, showed a dielectric constant below 4.

The above examples are merely illustrative and are not to be understood as limiting the scope of the invention, which is limited only as indicated by the appended claims.

What is claimed is:

1. A compound of the formula $$CH_2\text{---}CH(CH_2)_x\text{---}\langle\bigcirc\rangle\text{---}\left(\begin{array}{c}R\\|\\-Si-O\\|\\R\end{array}\right)_n\text{---}Si\text{---}\langle\bigcirc\rangle\text{---}(CH_2)_x\text{---}CH\text{---}CH_2$$

where R is a monovalent hydrocarbon radical selected from the group consisting of alkyl, aryl and aralkyl radicals, n is a whole number from 2 to 4 and x is a whole number from 0 to 4.

2. The compound as defined in claim 1 wherein R is a methyl.

3. A compound of the formula

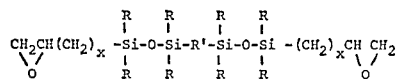

where R is a monovalent hydrocarbon radical selected from the group consisting of alkyl, aryl and aralkyl radicals, R' is a divalent aromatic hydrocarbon radical selected from the group consisting of m-phenylene, p-phenylene, diphenylene and diphenylene ether and x is a whole number from 0 to 4.

4. The compound as defined in claim 3 wherein R is methyl and R' is p-phenylene.

5. A compound of the formula

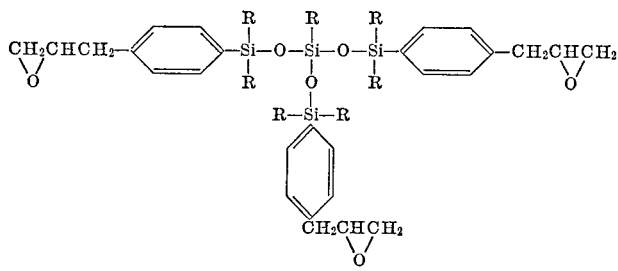

where R is a monovalent hydrocarbon radical selected from the group consisting of alkyl, aryl and aralkyl radicals.

6. The compound as defined in claim 5 wherein R is methyl.

7. The compound as defined in claim 2 wherein $x$ is 1 and $n$ is 2.

8. The compound as defined in claim 2 wherein $x$ is 1 and $n$ is 3.

9. The compound as defined in claim 2 wherein $x$ is 1 and $n$ is 4.

10. The compound as defined in claim 4 wherein $x$ is 1.

11. The compound as defined in claim 4 wherein $x$ is 2.

12. The compound as defined in claim 4 wherein $x$ is 0.

References Cited
UNITED STATES PATENTS

| | | | |
|---|---|---|---|
| 2,676,163 | 4/1954 | Speier | 260—46.5 |
| 2,883,395 | 4/1959 | Rogers et al. | 260—348 |
| 2,997,458 | 8/1961 | Lewis | 260—46.5 |
| 3,057,901 | 10/1962 | Plueddemann | 260—448.2 |
| 3,219,624 | 11/1965 | Cohen | 260—46.5 |
| 3,358,009 | 12/1967 | Omietanski et al. | 260—448.2 |
| 3,455,877 | 7/1969 | Plueddemann | 260—46.5 |

NORMA S. MILESTONE, Primary Examiner

U.S. Cl. X.R.

260—448.2 D, 448.2 E, 448.2 Q, 46.5 Y